United States Patent [19]

Sugino

[11] Patent Number: 5,275,832
[45] Date of Patent: Jan. 4, 1994

[54] EDIBLE PRODUCT OF FISH MEAT PASTE SIMULATING CRAB LEG MEAT

[75] Inventor: Yoshito Sugino, Nanao, Japan
[73] Assignee: Sugiyo Co., Ltd., Ishikawa, Japan
[21] Appl. No.: 848,064
[22] Filed: Mar. 9, 1992

Related U.S. Application Data

[62] Division of Ser. No. 655,069, Feb. 14, 1991, Pat. No. 5,145,701.

[30] Foreign Application Priority Data

Feb. 19, 1990 [JP] Japan .................................. 2-39280

[51] Int. Cl.$^5$ ............................................. A23L 1/27
[52] U.S. Cl. ..................... 426/249; 426/92; 426/125; 426/129; 426/233; 426/407; 426/410; 426/412
[58] Field of Search ............. 426/92, 249, 643, 125, 426/129, 233, 407, 410, 412

[56] References Cited

U.S. PATENT DOCUMENTS

| | | | |
|---|---|---|---|
| 4,540,589 | 9/1985 | Rachi et al. | 426/249 |
| 4,751,096 | 6/1988 | Nada et al. | 426/643 |
| 4,814,191 | 3/1989 | Yasuno | 426/92 |
| 4,824,687 | 4/1989 | Yasuno | 426/92 |
| 4,853,239 | 8/1989 | Suzuki et al. | 426/249 |

Primary Examiner—Helen Pratt
Attorney, Agent, or Firm—Wegner, Cantor, Mueller & Player

[57] ABSTRACT

As a continuous length of plastic film is supplied from a roll, a first type of fish meat paste is continuously applied onto the film so as to form thereon a continuous stripe of the first type of fish meat paste, on which a second type of fish meat paste is continuously applied with a certain pressure so that the two types of fish meat paste, one of which is colored red while the other is uncolored, are intermingled to form on the plastic film a membrane closely resembling the membrane covering real crab leg meat. A core comprising a bundle of fibers made of coagulated fish meat paste is placed on the membrane and wrapped therein by means of the plastic film. Heating coagulates the membrane thereby to form the membrane and the core wrapped therein into an integral body closely resembling real crab leg meat in appearance and texture.

10 Claims, 1 Drawing Sheet

EDIBLE PRODUCT OF FISH MEAT PASTE SIMULATING CRAB LEG MEAT

This application is a divisional of Ser. No. 07/655,069, filed Feb. 14, 1991, now U.S. Pat. No. 5,145,701.

BACKGROUND OF THE INVENTION

This invention relates to a method of producing an edible product of fish meat paste simulating crab leg meat and the edible product produced by the method. More particularly, this invention relates to a method of producing an improved substitute for crab leg meat which not only gives a particular oral sensation as if real crab leg meat were being eaten but also has an appearance closely resembling real crab leg meat and consequently has a high commercial value.

There are known various methods of making an edible product of fish meat paste simulating crab leg meat from fish meat paste mixed with suitable additives. The products obtained by the known methods are colored red so as to make them appear like natural crab leg meat, and there are known various methods of coloring the products. In one of them, which will be referred to as method I, one surface of a heat-coagulated mass of fish meat paste containing additives is colored red before it is cut into fiber-like pieces. In another method, which will be referred to as method II, such heat-coagulated mass is cut into fiber-like pieces, which are bundled into a rod-like core, the surface of which is colored by means of a brush. In a third method, which will be referred to as method III, a membrane of colored fish meat paste is formed on a plastic film by spraying, and a core is wrapped in the plastic film and consequently in the colored membrane. Method III is described in Japanese Examined Patent Publication No. 53-31938. In a fourth method, which will be referred to as method IV, a membrane of fish meat paste mottled with white and red is formed on a plastic film by a double-spraying method, and a core is wrapped in the membrane. Method IV is described in Japanese Unexamined Patent Publication No. 62-58970. Although the products made by methods I, II and III are colored, they do not resemble natural crab leg meat.

In method I, since the fiber-like pieces obtained by cutting a colored, heat-coagulated mass are bundled into a rod-like body, the uncolored surfaces of the fiber-like pieces are likely to appear in the surface of the rod-like body, so that the final product has an appearance quite different from real crab leg meat.

In method II, since a single color or a mixture of different colors are merely applied onto the surface of the core by a brush, the color and pattern produced are so monotonous that the final product looks different from actual crab leg meat.

In method III, the membrane in which the core is wrapped consists of a single layer, so that the color of the final product is monotonous. To obtain a product having a complex color, a mixture of colors, red and white for example, may be added to fish meat paste. The membrane made of the paste, however, becomes rosy or pink color, a mixed color or red and white, which is utterly different from the color of natural crab leg meat.

In method IV, the membrane is merely mottled with red and white, so that it is impossible to simulate the color tone and contour of natural crab leg meat.

In methods III and IV, since coloring is conducted by spraying only, it is likely that fish meat paste containing a coloring agent is sprayed beyond both sides of the plastic film, so that a considerable amount of fish meat paste is lost and the machine and its surrounding are stained with spray of the paste. With the spraying method, it is impossible to obtain a membrane of fish meat paste having a suitable width to wrap a core therein. If the width of the membrane is shorter than the circumference of the core, the membrane cannot cover the whole surface of the core, but some portion of the core is left exposed with resulting decrease of the commercial value of the product. On the contrary, if the width of the membrane is longer than the circumference of the core, the membrane extends to both side edges of the plastic film, so that the membrane is likely to be contaminated by the ambient atmosphere. This poses a problem from a sanitary viewpoint.

SUMMARY OF THE INVENTION

It is an object of the invention, therefore, to provide an edible product of fish meat paste which closely resembles natural crab leg meat in appearance and texture.

Another object of the invention is to provide a method of producing the above-mentioned edible product.

An additional object of the invention is to provide a method of wrapping a core material in a membrane made of fish meat paste.

In accordance with the invention, the method of preparing an edible product of fish meat paste simulating natural crab leg meat comprises:

a first step of continuously applying a first type of fish meat paste onto a portion of a continuous length of plastic film supplied longitudinally from a roll so as to form on the plastic film a stripe of the first type of fish meat paste having a width smaller than the width of the plastic film;

a second step of continuously applying with a predetermined pressure a second type of fish meat paste onto the stripe of the first type of fish meat paste over an area of a width smaller than the width of the plastic film and different from the width of the stripe, so that the two types of fish meat paste are partially intermingled to form on the plastic film a membrane closely resembling the membrane covering real crab leg meat;

a third step of placing a length of core material on the membrane and wrapping the core material in the plastic film thereby to wrap the core material in the membrane; and a fourth step of heating the membrane to coagulate it thereby to form the membrane and core into an integral body.

The method may further include a step of successively cutting the core material wrapped in the membrane into pieces of a predetermined length before the fourth heating step.

The first and second types of fish meat paste are of the same material. The only difference between the two types is that one of them is colored while the other is uncolored. If colored fish meat paste is used in the first step, uncolored fish meat paste is used in the second step. If uncolored fish meat paste is used in the first step, colored fish meat paste is used in the second step.

The characteristic of the invention is that in the second step fish meat paste, whether it be colored or uncolored, must be applied with a certain pressure onto the stripe of fish meat paste formed in the previous first step, so that the colored and uncolored fish meat pastes are partially intermingled to form a membrane closely resembling the membrane covering real crab leg meat, and that, whether in the first or second step, uncolored fish meat paste must be applied onto the plastic film or the stripe of colored fish meat paste, if previously formed thereon, over an area of a width greater than that of the stripe of colored fish meat paste already formed in the preceding step or to be formed in the succeeding one.

BRIEF DESCRIPTION OF THE DRAWINGS

The invention will be described below in further detail with reference to the accompanying drawings, wherein.

DETAILED DESCRIPTION OF THE INVENTION

Figure 1:
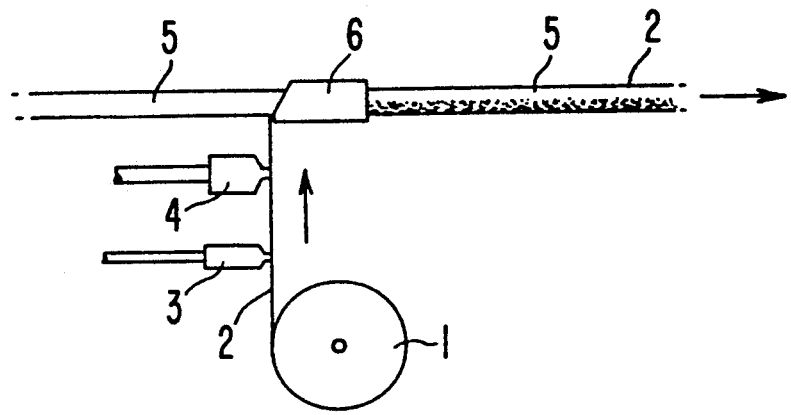
FIG. 1 is a schematic side view illustrating a method of the invention.

In the product produced by the method of the invention the weight ratio of the applied colored fish meat paste to the applied uncolored fish meat paste is in the range between 10 to 90 and 40 to 60, and the amount of the two types of fish meat paste is in the range from 0.01 $g/cm^2$ to 0.06 $g/cm^2$. The core material used in the invention may be in the form of a rod made of bundled noodle-like strings or threads of heat-coagulated fish meat paste. The threads may be of any length and diameter suitable for the purpose. The core may also be of any other shape and made of any edible material.

An example of the core used in the invention is prepared by mixing kneaded fish meat called "surimi" in Japanese and available on the market, starch, seasonings and other additives with iced water, kneading the mixture, forming the kneaded mass into a sheet, coagulating the sheet by heating, cutting the coagulated sheet into noodle-like strings, and bundling the strings into an elongated body.

An example of the uncolored fish meat paste used in the invention is prepared by mixing 100 parts by weight of fish meat paste or "surimi" in Japanese, 3.3 parts by weight of common salt, 15 parts by weight of starch, 0.2 parts by weight of polyphosphate, 4 parts by weight of egg white, 1 (one) part by weight of fat and/or oil, and 150 parts by weight of cold water and kneading the mixture into a pasty mass. The colored fish meat paste used in the invention may be prepared by mixing a red coloring agent into a pasty mass prepared in the same manner as mentioned above.

The weight ratio of the applied colored fish meat paste to the applied uncolored fish meat paste depends on the type of final product to be produced. By using a material prepared with the weight ratio between 10 to 90 and 40 to 60 it is possible to obtain a final product closely resembling natural crab leg meat in surface condition. If the amount of the colored fish meat paste exceeds the above weight ratio range, the surface of the product becomes too red, whereas if the amount of the uncolored fish meat paste exceeds the above weight ratio range, the surface of the product becomes too white. In either case, the color of the product does not resemble that of natural crab leg meat.

The amount of the colored and uncolored fish meat pastes to be applied is from 0.01 $g/cm^2$ to 0.06 $g/cm^2$. If the amount is less than the range, no membrane is formed. If the amount exceeds the range, the membrane formed loses transparency and cannot give the oral sensation which real crab leg meat gives when eaten, but the final product becomes like "kamaboko", a traditional Japanese food which is a kind of molded fish meat paste and, when eaten, gives a particular resistance to mastication quite different from that of crab leg meat.

The method of the invention will now be described with reference to the accompanying drawings. A continuous length of plastic film 2 is supplied from a roll 1. In the first step of the method, colored fish meat paste is applied onto a middle portion of the plastic film longitudinally so as to form thereon a continuous stripe 7 of colored fish meat paste having a predetermined width smaller than the width of the plastic film. The paste is applied by extruding it through a nozzle 3. The nozzle 3 must have a width corresponding to the colored portion of the final product. In accordance with the invention, since colored fish meat paste is applied onto a plastic film so as to form thereon a continuous layer or stripe having a relatively small width, the paste may also be applied by spraying. In this case, however, it is necessary to prevent the paste from being sprayed over an unnecessarily wide area. To this end, the distance between the tip of the spray nozzle 3 and the surface of the plastic film 2 is set to 3 cm to 4 cm, and the spraying pressure is kept as low as 0.15 $kg/cm^2$ to 0.5 $kg/cm^2$.

In the second step, uncolored fish meat paste is extruded through a nozzle 4 so as to be applied with a certain pressure onto the layer 7 of colored fish meat paste formed in the first step over an area of a width greater than that of the layer 7 of colored fish meat paste but smaller than the width of the plastic film 2. In the first step, either the extrusion method or the spraying method can be employed for application of colored fish meat paste onto the plastic film. In the second step, however, it is necessary to use the extrusion method only. By pressing uncolored fish meat paste extruded from the nozzle 4 onto the layer 7 of colored fish meat paste which is not yet coagulated by heating, it is possible to have the colored and uncolored fish meat pastes partially intermingled in a complex pattern thereby to form a membrane 8 closely resembling the membrane covering the muscle tissues of natural crab leg meat.

By changing the width of the extrusion nozzle 4 it is possible to easily adjust the width of the membrane 8 in accordance with the circumference of the rod-like core 5 to be wrapped in the membrane. By providing the nozzle 4 with a surface having a plurality of extrusion holes and adjusting the pressure with which the nozzle 4 is applied onto the layer 7 of colored fish meat paste, it is possible to change the thickness, color, pattern and texture of the membrane.

In the third step, the core 5 which comprises a bundle of fiber-like pieces of heat-coagulated fish meat paste is placed on the membrane 8 formed in the second step and wrapped therein by means of the plastic film 2.

Figure 2:
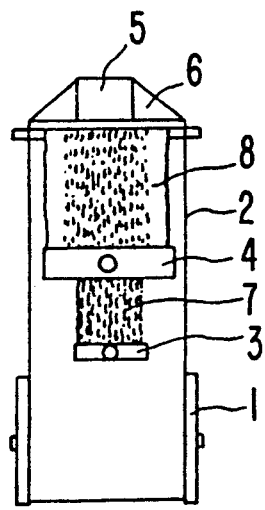
FIG. 2 is a schematic front view of the apparatus of FIG. 1.
Figure 3:
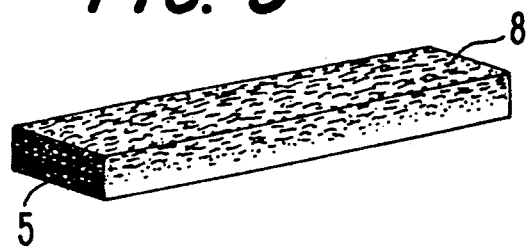
FIG. 3 is a schematic perspective view of a product produced by the method of the invention.

In the fourth step, the membrane 8 is coagulated by heating. As the material of the membrane 8 coagulates, it enters gaps existing between the bundled fiber-like pieces of the core 5, so that the membrane 8 and the core 5 wrapped therein form an integral body closely resembling crab leg meat. In FIGS. 1 and 2, the reference numeral 6 designates a device for guiding the film 2 and wrapping the core 5 in the film.

Before the membrane is coagulated, the wrapped core may be successively cut into pieces of a predtermined short length, which are then heated to coagulate the membrane.

In the illustrated embodiment, colored fish meat paste is used in the first step and uncolored fish meat paste is used in the second step. On the contrary, uncolored fish meat paste may be used in the first step and colored fish meat paste may be used in the second step.

In accordance with the invention, in the second step uncolored (or colored) fish meat paste is extruded from a nozzle to be applied with a certain pressure onto the layer of colored (or uncolored) fish meat paste formed on the plastic film in the first step, so that the colored and uncolored pastes are intermingled thereby to form an integral membrane closely resembling natural crab leg meat and having a color tone and/or a shaded pattern which could not be realized otherwise.

In the final product produced by the method of the invention the colored fish meat paste always appears in the surface of the product and gives the product an appearance quite similar to natural crab leg meat, so that the defects of the previously described method I have been eliminated. Since the colored and uncolored fish meat pastes are intermingled to form an integral membrane, the final product has a more complex color and pattern, so that the product resembles natural crab leg meat in color and texture more closely than those produced by methods II and III.

Since the uncolored (or colored) fish meat paste is extruded through a nozzle to be applied with a pressure onto the thin layer of colored (or uncolored) fish meat paste, the membrane formed by incorporation of the colored and uncolored pastes is not mottled as in the product prepared by the previously described known method IV but has a varied color tone with a complex pattern resembling natural crab leg meat.

What I claim is:

1. An edible product of fish meat paste simulating natural crab leg meat comprising:
    a first type of fish meat paste;
    a second type of fish meat paste; and
    a core material,
    wherein the two types of fish meat paste are partially intermingled to form a membrane, said membrane having a varied color tone which is not mottled,
    said edible product of fish meat paste being produced by a method comprising:
    a first step of continuously applying said first type of fish meat paste onto a portion of a continuous length of plastic film supplied longitudinally from a roll, said continuous length of plastic film having a width, so as to form on said continuous length of plastic film a stripe of said first type of fish meat paste having a width smaller than the width of said continuous length of plastic film;
    a second step of continuously applying, with a predetermined pressure, said second type of fish meat paste onto said stripe of said first type of fish meat paste over an area having a width smaller than the width of said plastic film and different from the width of said stripe of said first type of fish meat paste, said second type of fish meat paste being colored differently from said first type of fish meat paste so that the two types of fish meat paste are partially intermingled so as to form on said plastic film said membrane, said membrane closely resembling the membrane covering real crab leg meat;
    a third step of placing a length of said core material on said membrane and wrapping said core material in said plastic film thereby to wrap said core material in said membrane; and
    a fourth step of heating said membrane to coagulate said membrane, thereby to form said membrane and said core material into an integral body.

2. The product of claim 1, wherein the first and second types of fish meat paste are of the same material, said first type of fish meat paste is colored red and said second type of fish meat paste is uncolored, and wherein said second type of fish meat paste is applied onto said stripe of said first type of fish meat paste over an area having a width greater than the width of said stripe of said first type of fish meat paste but smaller than the width of said continuous length of plastic film.

3. The product of claim 2, wherein a weight ratio of said applied colored fish meat paste to said applied uncolored fish meat paste is in the range of between approximately 10 to 90 and approximately 40 to 60, and the two types of fish meat paste are applied in an amount of from approximately 0.01 g/cm$^2$ to approximately 0.06 g/cm$^2$.

4. The product of claim 1, wherein the first and second types of fish meat paste are of the same material, said first type of fish meat paste is uncolored and said second type of fish meat paste is colored red, and wherein said second type of fish meat paste is applied onto said stripe of said first type of fish meat paste over an area having a width smaller than the width of said stripe of said first type of fish meat paste.

5. The product of claim 4, wherein a weight ratio of said applied colored fish meat paste to said applied uncolored fish meat paste is in the range of between approximately 10 to 90 and approximately 40 to 60, and the two types of fish meat paste are applied in an amount of from approximately 0.01 g/cm$^2$ to approximately 0.06 g/cm$^2$.

6. The product of claim 1, wherein said core material comprises strings or pieces of heat-coagulated fish meat paste.

7. An edible product of fish meat paste simulating natural crab leg meat comprising:
    a first type of fish meat paste;
    a second type of fish meat paste; and
    a core material,
    wherein the two types of fish meat paste are partially intermingled to form a membrane, said membrane having a varied color tone which is not mottled,
    said edible product of fish meat paste being produced by a method comprising:
    a first step of continuously applying said first type of fish meat paste onto a portion of a continuous length of plastic film supplied longitudinally from a roll, said continuous length of plastic film having a width, so as to form on said continuous length of plastic film a stripe of said first type of fish meat paste having a width smaller than the width of said continuous length of plastic film;
    a second step of continuously applying, with a predetermined pressure, said second type of fish meat paste onto said stripe of said first type of fish meat paste over an area having a width smaller than the width of said plastic film and different from the width of said stripe of said first type of fish meat paste, said second type of fish meat paste being colored differently from said first type of fish meat paste so that the two types of fish meat paste are partially intermingled to form said membrane on said plastic film;

a third step of placing a length of said core material on said membrane and wrapping said core material in said plastic film thereby to wrap said core material in said membrane.

8. The product of claim 7, wherein the first and second types of fish meat paste are of the same material, said first type of fish meat paste is colored and said second type of fish meat paste is uncolored, and wherein said second type of fish meat paste is applied onto said stripe of said first type of fish meat paste over an area having a width greater than the width of said stripe of said first type of fish meat paste but smaller than the width of said continuous length of plastic film.

9. The product of claim 7, wherein the first and second types of fish meat paste are of the same material, said first type of fish meat paste is uncolored and said second type of fish meat paste is colored, and wherein said second type of fish meat paste is applied onto said stripe of said first type of fish meat paste over an area having a width smaller than the width of said stripe of said first type of fish meat paste.

10. The product of claim 7, wherein said method further comprises a fourth step of heating said membrane to coagulate said membrane, thereby to form said membrane and said core into an integral body.

* * * * *